US011978577B2

(12) United States Patent
Noumi et al.

(10) Patent No.: US 11,978,577 B2
(45) Date of Patent: May 7, 2024

(54) INDUCTOR

(71) Applicant: Murata Manufacturing Co., Ltd., Kyoto-fu (JP)

(72) Inventors: Yoshitake Noumi, Nagaokakyo (JP); Kenta Nohara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 294 days.

(21) Appl. No.: 17/217,887

(22) Filed: Mar. 30, 2021

(65) Prior Publication Data

US 2021/0313106 A1 Oct. 7, 2021

(30) Foreign Application Priority Data

Apr. 7, 2020 (JP) ................................ 2020-069145

(51) Int. Cl.

| | |
|---|---|
| ***H01F 27/255*** | (2006.01) |
| ***H01F 27/28*** | (2006.01) |
| ***H01F 27/29*** | (2006.01) |
| ***H01F 41/04*** | (2006.01) |

(52) U.S. Cl.
CPC ....... *H01F 27/2804* (2013.01); *H01F 27/255* (2013.01); *H01F 27/29* (2013.01); *H01F 41/041* (2013.01); *H01F 2027/2809* (2013.01)

(58) Field of Classification Search
CPC ...... H01F 1/26; H01F 17/04; H01F 2017/048; H01F 2027/2809; H01F 27/255; H01F 27/2804; H01F 27/2852; H01F 27/29; H01F 27/292; H01F 41/041
See application file for complete search history.

(56) References Cited

U.S. PATENT DOCUMENTS

| | | | | |
|---|---|---|---|---|
| 7,570,477 B2 * | 8/2009 | Kayatani | H01G 13/006 | 361/308.1 |
| 2016/0035476 A1 * | 2/2016 | Mimura | H01F 41/046 | 336/199 |
| 2016/0055961 A1 * | 2/2016 | Gu | H01F 17/04 | 29/602.1 |

(Continued)

FOREIGN PATENT DOCUMENTS

| | | |
|---|---|---|
| CN | 105321685 A | 2/2016 |
| CN | 105390232 A | 3/2016 |
| JP | 2016-032050 A | 3/2016 |

*Primary Examiner* — Holly Rickman
*Assistant Examiner* — Linda N Chau
(74) *Attorney, Agent, or Firm* — Studebaker & Brackett PC

(57) ABSTRACT

An inductor includes a coil having a winding portion, and a pair of lead-out portions extended from the winding portion; a body containing the coil and including a magnetic portion, the magnetic portion including metallic particles and a first resin; and a pair of outer electrodes on a surface of the body. The body has a metallic-particle exposed region on its surface. Each outer electrode includes a conductive resin layer, and a first plating layer on the conductive resin layer. The conductive resin layer is disposed on at least the metallic-particle exposed region. The first plating layer includes a first covering region covering the conductive resin layer, and a first extending region continuous to the first covering region and extending to at least the metallic-particle exposed region. The first plating layer is connected with at least a portion of the metallic particles on the metallic-particle exposed region.

13 Claims, 3 Drawing Sheets

(56) References Cited

U.S. PATENT DOCUMENTS

| | | | | |
|---|---|---|---|---|
| 2017/0178793 | A1* | 6/2017 | Muneuchi | H01F 41/076 |
| 2019/0122810 | A1* | 4/2019 | Oh | H01F 17/0013 |
| 2019/0206625 | A1* | 7/2019 | Kim | H01G 4/232 |

* cited by examiner

INDUCTOR

CROSS-REFERENCE TO RELATED APPLICATION

This application claims benefit of priority to Japanese Patent Application No. 2020-069145, filed Apr. 7, 2020, the entire content of which is incorporated herein by reference.

BACKGROUND

Technical Field

The present disclosure relates to an inductor.

Background Art

Japanese Unexamined Patent Application Publication No. 2016-032050 proposes an inductor. The inductor includes an air-core coil embedded in a magnetic body made of resin and metallic magnetic portionicles, and outer electrodes electrically coupled to opposite end portions of the coil and made of conductive resin including silver (Ag) particles.

The outer electrodes made of conductive resin including Ag particles are made to adhere to a body by means of resin. Consequently, depending on the environment in which the inductor is used, the outer electrodes may not be secured to the body with sufficient strength.

SUMMARY

Accordingly, the present disclosure provides an inductor that allows for improved strength of securing of outer electrodes to a body.

According to preferred embodiments of the present disclosure, there is provided an inductor including a coil, a body, and a pair of outer electrodes. The coil has a winding portion including a wound conductor, and a pair of lead-out portions extended from the winding portion. The body contains the coil, and includes a magnetic portion including metallic particles and a first resin. The outer electrodes are disposed on a surface of the body. The body has, on its surface, a metallic-particle exposed region where the metallic particles are exposed. Each outer electrode includes a conductive resin layer, and a first plating layer disposed on the conductive resin layer. The conductive resin layer is disposed on at least the metallic-particle exposed region. The first plating layer includes a first covering region covering the conductive resin layer, and a first extending region continuous to the first covering region and extending to at least the metallic-particle exposed region. The first plating layer is connected in the first extending region with at least a portion of the metallic particles on the metallic-particle exposed region.

Other features, elements, characteristics and advantages of the present disclosure will become more apparent from the following detailed description of preferred embodiments of the present disclosure with reference to the attached drawings.

DETAILED DESCRIPTION

Figure 1:
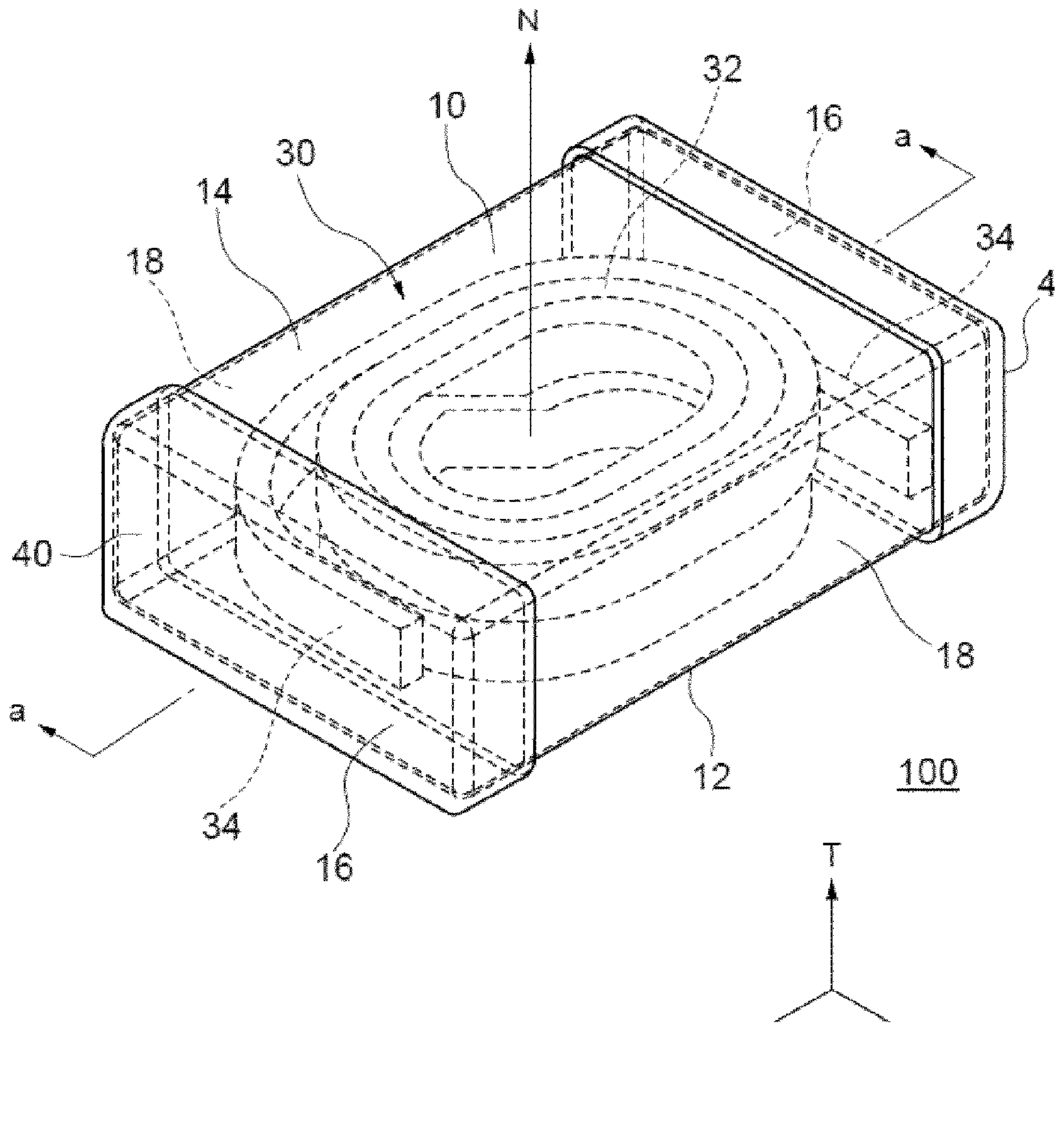
FIG. 1 is a partially see-through perspective view, as seen from above, of an inductor according to Embodiment 1.

An inductor includes a coil, a body, and a pair of outer electrodes. The coil has a winding portion including a wound conductor, and a pair of lead-out portions extended from the winding portion. The body contains the coil, and includes a magnetic portion including metallic particles and a first resin. The outer electrodes are disposed on a surface of the body. The body has, on its surface, a metallic-particle exposed region where the metallic particles are exposed. Each outer electrode includes a conductive resin layer, and a first plating layer disposed on the conductive resin layer. The conductive resin layer is disposed on at least the metallic-particle exposed region. The first plating layer includes a first covering region covering the conductive resin layer, and a first extending region continuous to the first covering region and extending to at least the metallic-particle exposed region. The first plating layer is connected in the first extending region with at least a portion of the metallic particles on the metallic-particle exposed region.

As described above, each outer electrode includes the conductive resin layer and the first plating layer, and the first plating layer covering the conductive resin layer is directly connected to the metallic particles exposed on the metallic-particle exposed region. This configuration improves the strength of securing of the first plating layer to the body, resulting in improved strength of securing of the outer electrodes to the body. Further, the conductive metal constituting the first plating layer is connected by metallic bonding to the metallic particles on the surface of the body. This further improves the strength of securing of the first plating layer to the body.

Each outer electrode may further include a second plating layer disposed on the first plating layer. The second plating layer may include a second covering region that covers the first plating layer, and a second extending region continuous to the second covering region. The second extending region of the second plating layer may cover a portion of the metallic-particle exposed region, and may be connected with at least a portion of the metallic particles on the metallic-particle exposed region. In addition to the first plating layer, the second plating layer is thus connected by metallic bonding to the metallic particles exposed on the metallic-particle exposed region. This further improves the strength of securing of the outer electrodes to the body.

The body may have, on its surface, a metallic-particle unexposed region continuous to the metallic-particle exposed region, and the second extending region of the second plating layer may extend to the metallic-particle unexposed region. As a result, the metallic-particle exposed region is covered by the second plating layer and the first plating layer. This allows moisture resistance to be maintained over an extended period of time. The second extending region may have a minimum length of greater than or equal to 3 μm in the direction of extension of the second extending region. The second plating layer may include tin.

The body may have, on its surface, a metallic-particle unexposed region continuous to the metallic-particle exposed region, and the first extending region of the first plating layer may extend to the metallic-particle unexposed region. As a result, the conductive resin layer is covered more effectively, and the outer electrodes are secured to the body with improved strength. The first extending region may have a minimum length of greater than or equal to 50 μm in the direction of extension of the first extending region. The first plating layer may include nickel. Further, the conductive resin layer may include conductive powder and a second resin.

The metallic-particle exposed region may be a region irradiated with laser light. This ensures that, if the metallic particles have an insulating coating on the surface, the insulating layer is removed from the surface of the metallic particles more effectively. The body may have an end face, a bottom face, a top face, and a lateral face, and the metallic-particle exposed region may be disposed on the end face, on a portion of the bottom face continuous to the end face, on a portion of the top face continuous to the end face, and on a portion of the lateral face continuous to the end face. Placing each outer electrode to extend over these faces of the body helps to further improve the strength of securing of the outer electrodes to the body.

The scope of the term "step" as used herein includes not only independent steps, but also steps that are not clearly distinguishable from other steps as long as the intended purpose of such steps is accomplished. Embodiments of the present disclosure are described below with reference to the drawings. It is to be noted, however, that the following description of the embodiments is only illustrative of exemplary embodiments of an inductor for implementing the technical idea of the present disclosure, and not intended to limit the present disclosure to the specific details of the inductor described below. The following description is by no means intended to limit the embodiments defined in the claims to the components in the embodiments. In particular, unless specifically stated otherwise, the dimensions, materials, shapes, relative positions, and other features of the components described in the embodiments are illustrative only and not intended to limit the present disclosure to the particular features described. In the drawings, like reference signs are used to designate like features. Although separate embodiments are herein described for convenience in consideration of ease of explanation or understanding of the main scope of the present disclosure, features described in different embodiments may be replaced or combined with each other. In Embodiment 2 and the subsequent embodiments, features identical to those in Embodiment 1 are not described in further detail, and only differences from Embodiment 1 are described. In particular, the same or similar operational effects provided by the same or similar features are not described below in each individual embodiment.

EMBODIMENTS

Although the present disclosure is described below with reference to its specific embodiments, the present disclosure is not limited to the particular embodiments described herein.

Embodiment 1

Figure 2:
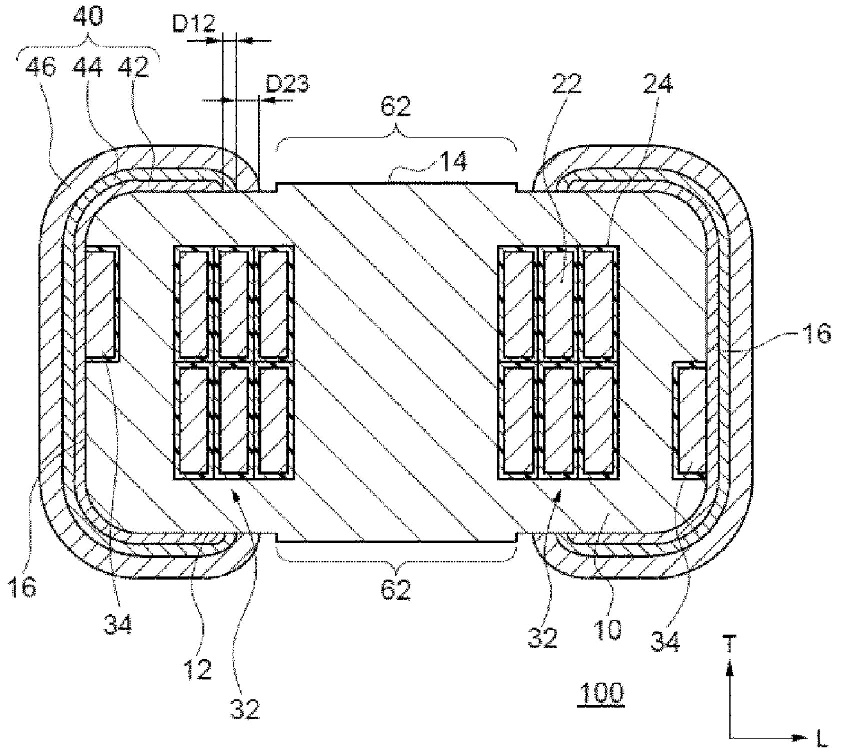
FIG. 2 illustrates a cross-section of the inductor according to Embodiment 1 taken along a line a-a in FIG. 1.

An inductor according to Embodiment 1 is described below with reference to FIGS. 1 and 2. FIG. 1 is a partially see-through perspective view of an inductor 100 as seen from above. FIG. 2 illustrates a schematic cross-section of the inductor 100 taken along a line a-a in FIG. 1 and orthogonal to the bottom and top faces of the inductor 100.

As illustrated in FIG. 1, the inductor 100 includes: a coil 30; a body 10 containing the coil 30 and including a magnetic portion, the magnetic portion including metallic particles and a first resin, the metallic particles having an insulating coating on a surface thereof; and a pair of outer electrodes 40 disposed on the surface of the body 10 and electrically coupled to the coil 30. The body 10 has: a bottom face 12 serving as a mounting face; a top face 14 facing the bottom face 12 in the direction of height (direction T); two end faces 16 adjacent and substantially orthogonal to the bottom face 12 and facing each other in the direction of length (direction L); and two lateral faces 18 adjacent and substantially orthogonal to the bottom face 12 and the end faces 16 and facing each other in the direction of width (direction W). The coil 30 has a winding portion 32 including a conductor wound around a winding axis N, and a pair of lead-out portions 34 extended from the winding portion 32. Each lead-out portion 34 is partially connected to the corresponding outer electrode on the corresponding end face 16 of the body 10. Each outer electrode 40 is disposed on five faces of the body 10, including a portion of the bottom face 12, a portion of the top face 14, a portion of one lateral face 18, a portion of the other lateral face 18, and one end face 16. In FIG. 1, dashed lines are sometimes used as auxiliary lines to represent curved faces.

The surface of the body 10 includes a metallic-particle unexposed region 62, and a metallic-particle exposed region other than the metallic-particle unexposed region 62. In FIGS. 1 and 2, the metallic-particle exposed region is provided to continuously extend over a portion of the bottom face 12, a portion of the top face 14, a portion of each lateral face 18, and each end face 16. The metallic-particle unexposed region 62 is provided to continuously extend over the following portions of the body 10 so as to surround the body 10: a portion of the bottom face 12; a portion of each lateral face 18; and a portion of the top face 14. In the metallic-particle exposed region, the first resin constituting the body 10, and the insulating coating on the surface of the metallic particles constituting the body 10 are partially removed so that the metallic particles are exposed on the surface of the body 10. In the metallic-particle exposed region, the exposed metallic particles may partially couple to each other to form a network structure of metallic particles. The surface roughness in the metallic-particle exposed region may be greater than the surface roughness in the metallic-particle unexposed region 62. The metallic-particle exposed region is formed by, for example, irradiating a desired region on the surface of the body with laser light. The metallic-particle exposed region may be formed by any method that enables removal of the first resin on the surface of the body and the insulating coating on the surface of the metallic particles, for example, sand blasting. The metallic-particle unexposed region 62 may be a region where the first resin on the surface of the body and the insulating coating on the surface of the metallic particles are not removed, may be a region not irradiated with laser light, or may be a region where a protective layer described later is disposed.

As illustrated in FIG. 2, each outer electrode 40 includes a conductive resin layer 42, a first plating layer 44, and a second plating layer 46, which are stacked in the stated order as seen from the body. The conductive resin layer 42 may be formed by, for example, applying a conductive resin paste including conductive powder and a second resin to the surface of the body 10 and curing the paste. The conductive resin layer 42 is electrically coupled to a portion of the corresponding lead-out portion 34 of the coil. The conductive powder may include, for example, silver (Ag) particles.

The second resin may include, for example, a thermosetting resin such as an epoxy resin. The first plating layer 44 may include, for example, a nickel layer formed on the conductive resin layer 42 by plating. The second plating layer 46 may include, for example, a tin layer formed on the first plating layer by plating.

The conductive resin layer 42 of each outer electrode 40 is disposed on the metallic-particle exposed region of the body 10. The adhesion of the conductive resin layer 42 to the body 10 is derived from the surface roughness of the metallic-particle exposed region to which the second resin included in the conductive resin layer adheres. The metallic-particle exposed region has an increased surface roughness due to removal of a portion of the first resin. This configuration improves the strength of securing of the outer electrodes to the body. The first plating layer 44 covers the entire conductive resin layer 42, and further extends to the metallic-particle exposed region. The first plating layer 44 has a first covering region covering the conductive resin layer 42, and a first extending region continuous to the first covering region and extending to the metallic-particle exposed region. The first plating layer 44 is directly connected in the first extending region to the metallic particles exposed on the metallic-particle exposed region. The first plating layer 44 is formed by plating, and connected to the metallic particles by metallic bonding. This configuration improves the strength of securing of the outer electrodes to the body.

In FIG. 2, the second plating layer 46 covers the first plating layer 44, and further extends to the metallic-particle exposed region. The second plating layer 46 includes a second covering region covering the first plating layer 44, and a second extending region continuous to the second covering region and extending to the metallic-particle exposed region. The second plating layer 46 is directly connected in the second extending region to the metallic particles exposed on the metallic-particle exposed region. The second plating layer 46 is formed by plating, and connected to the metallic particles by metallic bonding. This configuration improves the strength of securing of the outer electrodes to the body. Although the second plating layer 46 is depicted in FIG. 2 as having the second extending region, the second plating layer 46 may have only a second covering layer that covers at least a portion of the first plating layer.

The conductive resin layer 42 may have a thickness of, for example, greater than or equal to about 3 μm and less than or equal to about 60 μm (i.e., from about 3 μm to about 60 μm). The conductive resin layer 42 may be disposed with a substantially uniform thickness on each face of the body 10, or may be disposed with a different thickness on each face of the body 10. The conductive resin layer 42 may be, for example, thicker or thinner on each end face 16 than on the bottom face 12, each lateral face 18, and the top face 14. The first plating layer 44 may have a thickness of, for example, greater than or equal to about 3 μm and less than or equal to about 15 μm (i.e., from about 3 μm to about 15 μm). The first plating layer 44 may be disposed with a substantially uniform thickness on each face of the body 10, or may be disposed with a different thickness on each face of the body 10. On the top face 14, each lateral face 18, and the bottom face 12, the first extending region of the first plating layer 44 may have a minimum length D12 in the direction of extension of the first extending region of, for example, greater than or equal to about 50 μm, or greater than or equal to about 75 μm (i.e., from about 50 μm to about 75 μm). The second plating layer 46 may have a thickness of, for example, greater than or equal to about 3 μm and less than or equal to about 15 μm (i.e., from about 3 μm to about 15 μm). The second plating layer 46 may be disposed with a substantially uniform thickness on each face of the body 10, or may be disposed with a different thickness on each face of the body 10. On the top face 14, each lateral face 18, and the bottom face 12, the second extending region of the second plating layer 46 may have a minimum length D23 in the direction of extension of the second extending region that is, for example, greater than or equal to about 3 μm, or substantially equal to or different from the thickness of the second plating layer 46.

As illustrated in FIG. 2, a conductor 22 forming the coil 30 may have a covering layer 24 on its surface, and the cross-section of the conductor 22 taken orthogonal to the direction of extension (length) of the conductor may have a substantially rectangular shape defined by a thickness and a width. The conductor may have a thickness of, for example, greater than or equal to about 0.01 mm and less than or equal to about 1 mm (i.e., from about 0.01 mm to about 1 mm). The conductor may have a width of, for example, greater than or equal to about 0.1 mm and less than or equal to about 2 mm (i.e., from about 0.1 mm to about 2 mm). The aspect ratio (width/thickness) of the cross-section of the conductor may be, for example, greater than or equal to about 1, or may be greater than or equal to about 1 and less than or equal to about 30 (i.e., from about 1 to about 30). The covering layer 24 covering the conductor 22 may be made of insulating resin such as polyimide or polyamide-imide with a thickness of, for example, greater than or equal to about 2 μm and less than or equal to about 20 μm (i.e., from about 2 μm to about 20 μm). The surface of the covering layer 24 may be further provided with a fusion layer containing a self-fusing component such as a thermoplastic resin or thermosetting resin. The fusion layer may have a thickness of greater than or equal to about 1 μm and less than or equal to about 8 μm (i.e., from about 1 μm to about 8 μm). The presence of the fusion layer helps to reduce unwinding of the winding portion.

The coil 30 is a coil of a conductor alpha-wound in two stages including upper and lower stages. The alpha-wound coil 30 has the following components: the winding portion 32 with the conductor wound in two stages including upper and lower stages such that, in the upper stage of the winding portion 32, the conductor is wound in spiral form from the outer periphery toward the inner periphery before being connected to the lower stage at the innermost periphery, and in the lower stage, the conductor is wound in spiral form from the inner periphery toward the outer periphery; and the pair of lead-out portions 34 each extended from the outermost periphery of the corresponding one of the upper and lower stages. The coil 30 is contained in the body 10 with the winding axis N of the winding portion 32 oriented substantially orthogonal to the bottom and top faces 12 and 14 of the body 10.

As illustrated in FIGS. 1 and 2, one lead-out portion 34 is partially exposed from one end face 16 of the body. The other lead-out portion 34 is partially exposed from the other end face 16 of the body. The covering layer 24 is removed from the surface of the conductor 22 through a portion of each lead-out portion 34 exposed from the corresponding end face 16.

The body 10 may be substantially cuboid in shape. The body 10 is sized to have the following dimensions: a length L of, for example, greater than or equal to about 1 mm and less than or equal to about 3.4 mm (i.e., from about 1 mm to about 3.4 mm), preferably greater than or equal to about 1 mm and less than or equal to about 3 mm (i.e., from about 1 mm to about 3 mm); a width W of, for example, greater than or equal to about 0.5 mm and less than or equal to about 2.7 mm (i.e., from about 0.5 mm to about 2.7 mm), preferably greater than or equal to about 0.5 mm and less than or equal to about 2.5 mm (i.e., from about 0.5 mm to about 2.5 mm); and a height T of, for example, greater than or equal to about 0.5 mm and less than or equal to about 2 mm (i.e., from about 0.5 mm to about 2 mm), preferably greater than or equal to about 0.5 mm and less than or equal to about 1.5 mm (i.e., from about 0.5 mm to about 1.5 mm). Specifically, the body may be sized to have dimensions L×W×T of, for example, about 1 mm×about 0.5 mm×about 0.5 mm, about 1.6 mm×about 0.8 mm×about 0.8 mm, about 2 mm×about 1.2 mm×about 1 mm, or about 2.5 mm×about 2 mm×about 1.2 mm.

The magnetic portion of the body 10 is made of a composite material containing the metallic particles and the first resin. Suitable examples of the metallic particles include iron-based metallic magnetic portionicles such as Fe, Fe—Si, Fe—Ni, Fe—Si—Cr, Fe—Si—Al, Fe—Ni—Al, Fe—Ni—Mo, and Fe—Cr—Al, metallic magnetic portionicles with other compositions, metallic magnetic portionicles such as amorphous metallic magnetic portionicles, metallic magnetic portionicles whose surface is coated with an insulating layer such as glass, metallic magnetic portionicles with a modified surface, and nano-level minute metallic magnetic portionicles. Suitable examples of the first resin include thermosetting resins such as epoxy resins, polyimide resins, and phenolic resins, and thermoplastic resins such as polyethylene resins, polyamide resins, and liquid crystal polymers. The proportion of the area of the metallic particles relative to a predetermined area of the cross-section of the inductor is preferably greater than or equal to about 50% and less than or equal to about 85% (i.e., from about 50% to about 85%), preferably greater than or equal to about 60% and less than or equal to about 85% (i.e., from about 60% to about 85%), or greater than or equal to about 70% and less than or equal to about 85% (i.e., from about 70% to about 85%). The proportion of the area of the metallic particles can be obtained from the mean diameter of the metallic particles in a predetermined area of the central portion of the cross-section passing through the center of the inductor and taken in the longitudinal direction (direction L) of the inductor.

A protective layer may be disposed on the surface of the body 10. The protective layer may be disposed on the surface of the body except for a region where each outer electrode is disposed, or may be disposed on the surface of the body except for a region where a portion of each lead-out portion is exposed. The protective layer may include, for example, resin. Suitable examples of the resin constituting the protective layer include thermosetting resins such as epoxy resins, polyimide resins, and phenolic resins, and thermoplastic resins such as acrylic resins, polyethylene resins, and polyamide resins. The protective layer may include a filler. Suitable examples of the filler include non-conductive fillers such as silicon oxides and titanium oxides. The protective layer is formed by, for example, applying a resin composition including a resin and a filler by coating, immersion, or other methods to the surface of the body, and then curing the applied resin as required.

The body 10 may be provided with a marker (not illustrated). For example, the marker may be provided at a location on the top face 14 of the body near where each lead-out portion 34 is extended from the lower stage of the winding portion 32, and the marker may indicate the polarity of the inductor. The marker is provided by, for example, printing or laser engraving.

The inductor 100 may be produced by, for example, a production method described below. The production method includes a coil forming step of shaping a conductor into a predetermined shape to thereby form a coil; a body forming step of embedding the formed coil in a composite material including metallic particles and resin with a portion of each lead-out portion of the coil exposed, followed by application of pressure with a die or other device to thereby form a body; a metallic-particle exposing step of forming a metallic-particle exposed region in a portion of the surface of the body, and stripping off the covering layer of a portion of each lead-out portion; and an outer-electrode forming step of forming a conductive resin layer on a portion of each lead-out portion exposed on the surface of the body, and then forming a first plating layer on the conductive resin layer.

Embodiment 2

Figure 3:
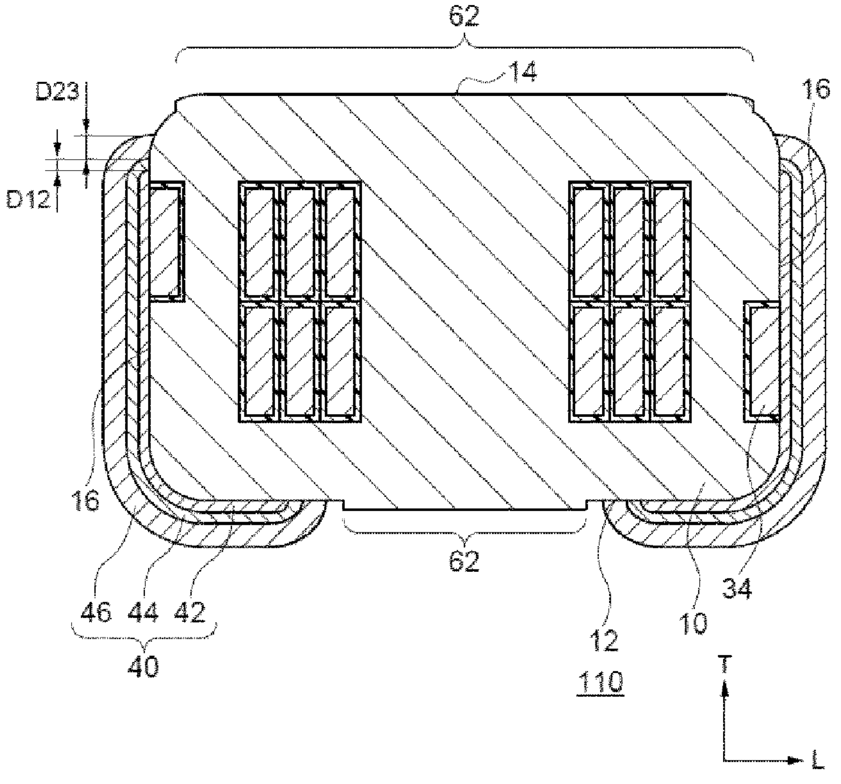
FIG. 3 illustrates a cross-section of an inductor according to Embodiment 2.

An inductor according to Embodiment 2 is described below with reference to FIG. 3. FIG. 3 illustrates a schematic cross-section of an inductor 110. The inductor 110 according to Embodiment 2 is similar in configuration to the inductor 100 according to Embodiment 1, except that no outer electrode is disposed on the top and lateral faces of the body, and that each outer electrode is disposed to extend over a portion of the bottom face and over a portion of the corresponding end face.

In the inductor 110, the metallic-particle unexposed region 62 on the top face 14 is enlarged relative to the metallic-particle unexposed region 62 on the bottom face 12, such that the top face 14 is covered with the metallic-particle unexposed region 62. Each lateral face of the inductor 110 is covered with the metallic-particle unexposed region 62. In the inductor 110, the metallic-particle exposed region is provided to extend over the corresponding end face 16 and over a portion of the bottom face 12.

It may suffice that the outer electrodes 40 be disposed to continuously extend over a portion of the bottom face 12 and over the corresponding end faces 16. The outer electrodes 40 may be disposed on the corresponding lateral faces 18. Placing the outer electrodes 40 in a substantially L shape helps to reduce the size of a fillet formed during mounting on the substrate. This allows for higher density mounting. On each end face 16, the first extending region of the first plating layer 44 may have a minimum length D12 in the direction of extension of the first extending region of, for example, greater than or equal to about 50 μm, or greater than or equal to about 75 μm (i.e., from about 50 μm to about 75 μm). On each end face 16, the second extending region of the second plating layer 46 may have a minimum length D23 in the direction of extension of the second extending region that is, for example, greater than or equal to about 3 μm, or substantially equal to or different from the thickness of the second plating layer 46.

Embodiment 3

Figure 4:
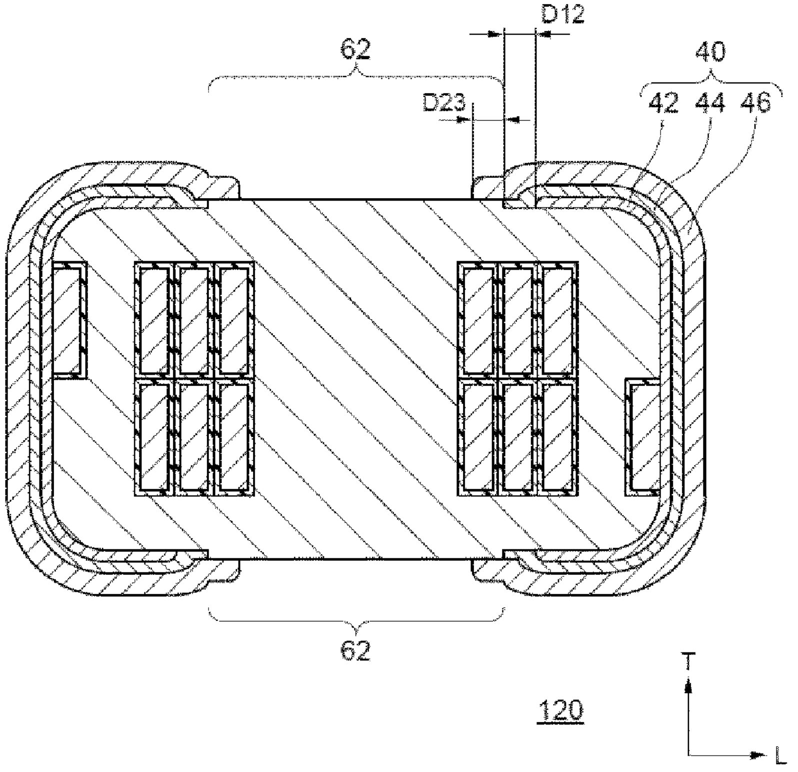
FIG. 4 illustrates a cross-section of an inductor according to Embodiment 3.

An inductor according to Embodiment 3 is described below with reference to FIG. 4. FIG. 4 illustrates a cross-section of an inductor 120. The inductor 120 according to Embodiment 3 is similar in configuration to the inductor 100 according to Embodiment 1, except that the second plating layer 46 of each outer electrode 40 extends to the metallic-particle unexposed region 62.

In the inductor 120, the second plating layer 46 extends to a portion of the metallic-particle unexposed region. This helps to maintain the moisture resistance of the inductor 120 over an extended period of time. In FIG. 4, the first extending region of the first plating layer 44 is disposed in contact with the metallic-particle unexposed region 62, and the second plating layer 46 is not connected to the metallic-particle exposed region. Alternatively, however, the second plating layer 46 may include a second extending region connected to the metallic-particle exposed region. In the inductor 120, the protective layer may not be disposed on a portion of the metallic-particle unexposed region to which the second plating layer 46 extends.

Embodiment 4

Figure 5:
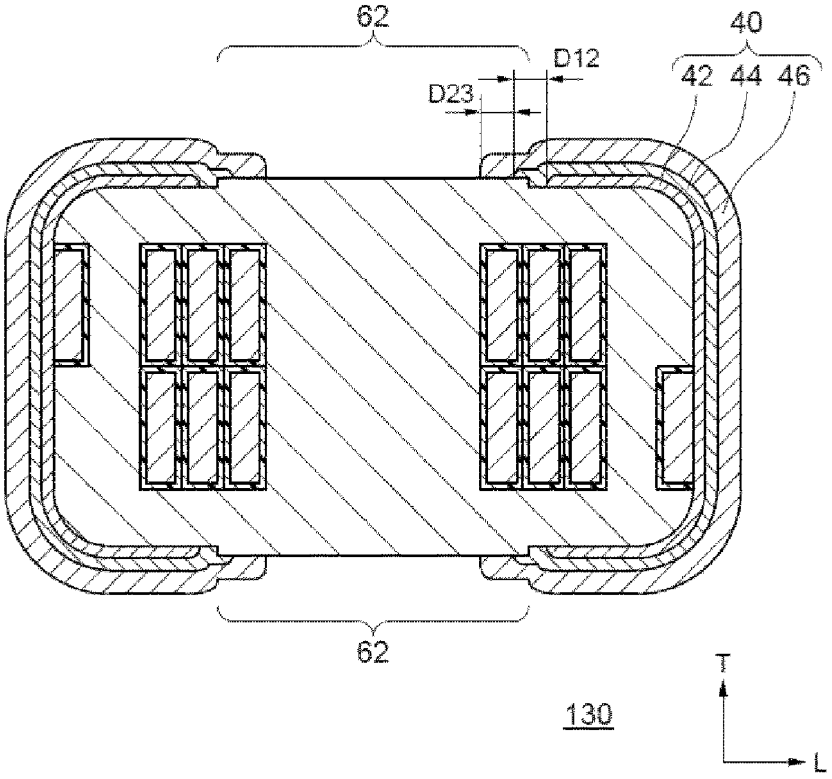
FIG. 5 illustrates a cross-section of an inductor according to Embodiment 4.

An inductor according to Embodiment 4 is described below with reference to FIG. 5. FIG. 5 illustrates a cross-section of an inductor 130. The inductor 130 according to Embodiment 4 is similar in configuration to the inductor 100 according to Embodiment 1, except that the first and second plating layers 44 and 46 of each outer electrode 40 extend to the metallic-particle unexposed region 62.

In the inductor 130, the first plating layer 44 and the second plating layer 46 extend to a portion of the metallic-particle unexposed region. This helps to maintain the moisture resistance of the inductor 130 over an extended period of time.

Although the inductor is described above as having the first plating layer made of nickel and the second plating layer made of tin, each plating layer may not necessarily be made of the above-mentioned metal but may be made of a metal selected from the group consisting of copper and silver. The first plating layer and the second plating layer may be made of the same metal. Further, a third plating layer may be provided on the second plating layer.

Although the outer electrodes are described above as being disposed to extend over at least the bottom face and the corresponding end faces of the body, the outer electrodes may be disposed only on the bottom face of the body.

The lead-out portions may be exposed not on the corresponding end faces of the body but on the bottom face of the body.

Although the conductor is described above as being substantially rectangular in cross-section taken orthogonal to the direction of extension of the conductor, the conductor may not necessarily be substantially rectangular in cross-section, but may be chamfered at the corners, or may have its edges defined by curves such as substantially semi-circular curves or substantially semi-elliptical curves.

As seen in the direction of the winding axis, the winding portion of the coil may have a shape other than a substantially oval shape, for example, a substantially circular shape, a substantially elliptical shape, or a chamfered, substantially polygonal shape. The conductive powder constituting the conductive resin layer may include Ag particles. The Ag particles may have a volume mean diameter of, for example, greater than or equal to about 10 nm and less than or equal to about 100 μm (i.e., from about 10 nm to about 100 μm). The conductive powder may include nano-sized Ag particles, or may include micro-sized Ag particles.

The protective layer may be made of, instead of a resin composition including a filler and a resin, an inorganic material such as water glass. The body may have a recess (stand-oft) provided in a region of the bottom face where no outer electrode is disposed.

The recess on the bottom face of the body may have a substantially semi-circular shape in the direction of height T as seen along the width W.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising:

a coil having a winding portion and a pair of lead-out portions, the winding portion including a wound conductor, the lead-out portions being extended from the winding portion;

a body containing the coil and including a magnetic portion, the magnetic portion including metallic particles and a first resin, and the body including a metallic-particle exposed region where the metallic particles are exposed on a surface of the body, and a metallic-particle unexposed region where the metallic particles are not exposed on a surface of the body; and a pair of outer electrodes disposed only on the metallic-particle exposed region of the body, wherein each of the outer electrodes includes a conductive resin layer that includes Ag and a second resin that is different than the first resin, a first plating layer disposed on the conductive resin layer, and a second plating layer disposed on the first plating layer, the conductive resin layer is disposed on at least the metallic-particle exposed region, the first plating layer is connected with at least a portion of the metallic particles on the metallic-particle exposed region, the first plating layer includes a first covering region and a first extending region, in which the first covering region covers the conductive resin layer, and the first extending region is continuous to the first covering region and extends to at least the metallic-particle exposed region, the second plating layer includes a second covering region covering the first plating layer, and a second extending region being continuous to the second covering region, and a ratio of a length of the first extending region of the first plating layer D12 to a length of the second extending region of the second plating layer D23 is 50:3 to 75:3.

2. The inductor according to claim 1, wherein the metallic-particle unexposed region is continuous to the metallic-particle exposed region, and the second extending region of the second plating layer extends to the metallic-particle unexposed region.

3. The inductor according to claim 1, wherein a minimum length of the second extending region is greater than or equal to 3 μm in a direction of extension of the second extending region.

4. The inductor according to claim 1, wherein the second plating layer includes tin.

5. The inductor according to claim 1, wherein the second extending region covers a portion of the metallic-particle exposed region, and is connected with at least a portion of the metallic particles on the metallic-particle exposed region.

6. The inductor according to claim 1, wherein the metallic-particle unexposed region is continuous to the metallic-particle exposed region, and the first extending region of the first plating layer extends to the metallic-particle unexposed region.

7. The inductor according to claim 1, wherein a minimum length of the first extending region is greater than or equal to 50 μm in a direction of extension of the first extending region.

8. The inductor according to claim 1, wherein the first plating layer includes nickel.

9. The inductor according to claim 1, wherein the metallic-particle exposed region is a region irradiated with laser light.

10. The inductor according to claim 1, wherein the body has an end face, a bottom face, a top face, and a lateral face, and the metallic-particle exposed region is disposed on the end face, on a portion of the bottom face continuous to the end face, on a portion of the top face continuous to the end face, and on a portion of the lateral face continuous to the end face.

11. The inductor according to claim 2, wherein a minimum length of the second extending region is greater than or equal to 3 μm in a direction of extension of the second extending region.

12. The inductor according to claim 2, wherein the second plating layer includes tin.

13. The inductor according to claim 2, wherein the second extending region covers a portion of the metallic-particle exposed region, and is connected with at least a portion of the metallic particles on the metallic-particle exposed region.

* * * * *